US011039398B2

(12) United States Patent
Vivanco et al.

(10) Patent No.: US 11,039,398 B2
(45) Date of Patent: Jun. 15, 2021

(54) UPLINK INTERFERENCE AVOIDANCE UNDER OPEN LOOP POWER CONTROL CONDITIONS

(71) Applicants: AT&T Intellectual Property I, L.P., Atlanta, GA (US); AT&T Technical Services Company, Inc., Vienna, VA (US)

(72) Inventors: Daniel Vivanco, Ashburn, VA (US); Thomas Henderson, Alpharetta, GA (US); David Ross Beppler, Duluth, GA (US); Arthur Brisebois, Cumming, GA (US)

(73) Assignees: AT&T INTELLECTUAL PROPERTY I, L.P., Atlanta, GA (US); AT&T TECHNICAL SERVICES COMPANY, INC., Vienna, VA (US)

( * ) Notice: Subject to any disclaimer, the term of this patent is extended or adjusted under 35 U.S.C. 154(b) by 190 days.

(21) Appl. No.: 16/428,851

(22) Filed: May 31, 2019

(65) Prior Publication Data

US 2020/0383059 A1 Dec. 3, 2020

(51) Int. Cl.
*H04W 52/10* (2009.01)
*H04W 52/24* (2009.01)
(Continued)

(52) U.S. Cl.
CPC ......... *H04W 52/10* (2013.01); *H04W 52/241* (2013.01); *H04W 52/243* (2013.01);
(Continued)

(58) Field of Classification Search
None
See application file for complete search history.

(56) References Cited

U.S. PATENT DOCUMENTS 6,760,596 B1 7/2004 Fiorini et al.
7,010,320 B2 3/2006 Komatsu
(Continued)

FOREIGN PATENT DOCUMENTS

CN 102333377 A 1/2012
KR 101659692 B1 9/2016
WO 2012171093 A1 12/2012

OTHER PUBLICATIONS

Notice of Allowance received for U.S. Appl. No. 16/388,769 dated Apr. 16, 2020, 57 pages.
(Continued)

*Primary Examiner* — Jutai Kao
(74) *Attorney, Agent, or Firm* — Amin, Turocy & Watson, LLP

(57) ABSTRACT

Various embodiments disclosed herein provide for facilitating uplink interference avoidance. According an embodiment, a system can comprise identifying network node devices and communication devices operating within a boundary located adjacent to an external system. The system can comprise determining communication settings of the communication devices that are engaged in an uplink session with the network node devices. The system can comprise estimating a total uplink interference into the external system based on a propagation model and an uplink power control value determined from the communication settings. The system can comprise in response to determining that the total uplink interference is greater than a defined value and in response to determining that the network node devices employed an open loop power control, requesting the network node devices to initiate an update to an uplink power limit (e.g., facilitate uplink power reduction) of the communication devices engaged in the uplink session with the network node devices.

20 Claims, 11 Drawing Sheets

(51) Int. Cl.
  *H04W 52/32* (2009.01)
  *H04W 52/36* (2009.01)
  *H04W 52/38* (2009.01)
(52) U.S. Cl.
  CPC ....... *H04W 52/325* (2013.01); *H04W 52/365* (2013.01); *H04W 52/367* (2013.01); *H04W 52/386* (2013.01)

(56) References Cited

U.S. PATENT DOCUMENTS

| | | | |
|---|---|---|---|
| 7,035,661 | B1 | 4/2006 | Yun |
| 7,376,390 | B2 | 5/2008 | Hayashi |
| 7,408,880 | B2 | 8/2008 | Xiao |
| 7,411,918 | B2 | 8/2008 | Zhang |
| 7,483,712 | B2 | 1/2009 | Komatsu |
| 7,554,954 | B2 | 6/2009 | Hosein et al. |
| 7,577,456 | B2 | 8/2009 | Gunnarsson et al. |
| 7,627,347 | B2 | 12/2009 | Codreanu et al. |
| 7,907,915 | B2 | 3/2011 | Cho et al. |
| 8,014,811 | B2 | 9/2011 | Sahara |
| 8,098,644 | B2 | 1/2012 | Xiao et al. |
| 8,134,980 | B2 | 3/2012 | Proctor, Jr. |
| 8,155,096 | B1 | 4/2012 | Proctor, Jr. |
| 8,285,319 | B2 | 10/2012 | Shin et al. |
| 8,812,046 | B2 | 8/2014 | Huang et al. |
| 8,842,602 | B2 | 9/2014 | Koo et al. |
| 8,929,880 | B2 | 1/2015 | Ratasuk et al. |
| 8,934,362 | B2 | 1/2015 | Hsu et al. |
| 9,019,905 | B2 | 4/2015 | Kazmi et al. |
| 9,042,894 | B2 | 5/2015 | Zhou et al. |
| 9,042,925 | B2 | 5/2015 | Seo et al. |
| 9,078,220 | B2 | 7/2015 | Makhlouf et al. |
| 9,220,072 | B2 | 12/2015 | Hsu et al. |
| 9,491,780 | B2 | 11/2016 | Pang et al. |
| 9,510,301 | B2 | 11/2016 | Chen et al. |
| 9,525,923 | B2 | 12/2016 | Proctor, Jr. |
| 9,629,096 | B2 | 4/2017 | Claussen et al. |
| 9,655,055 | B2 | 5/2017 | Morita et al. |
| 9,813,954 | B2 | 11/2017 | Ji et al. |
| 9,819,470 | B2 | 11/2017 | Fodor et al. |
| 9,907,028 | B1 | 2/2018 | Azem |
| 9,985,738 | B2 | 5/2018 | Zhou et al. |
| 10,009,904 | B2 | 6/2018 | Wang et al. |
| 10,070,397 | B2 | 9/2018 | Shin et al. |
| 10,117,256 | B2 | 10/2018 | Olfat et al. |
| 10,117,257 | B1 | 10/2018 | Nairn et al. |
| 10,165,483 | B1 | 12/2018 | Liu et al. |
| 10,187,881 | B2 | 1/2019 | Xu et al. |
| 10,244,540 | B2 | 3/2019 | Sundararajan |
| 10,264,534 | B1 | 4/2019 | Park |
| 10,425,901 | B2 | 9/2019 | Islam et al. |
| 10,455,520 | B2 | 10/2019 | Kosseifi et al. |
| 10,757,655 | B1 | 8/2020 | Vivanco et al. |
| 2003/0125068 | A1 | 7/2003 | Lee |
| 2004/0018850 | A1 | 1/2004 | Ishiguro et al. |
| 2005/0249149 | A1 | 11/2005 | Kasturi |
| 2007/0218950 | A1 | 9/2007 | Codreanu et al. |
| 2008/0146154 | A1 | 6/2008 | Claussen et al. |
| 2009/0109939 | A1 | 4/2009 | Bhushan et al. |
| 2009/0318152 | A1 | 12/2009 | Maheshwari |
| 2010/0087221 | A1* | 4/2010 | Srinivasan .......... H04W 52/343 455/522 |
| 2010/0330919 | A1* | 12/2010 | Gurney ................. H04W 16/14 455/67.11 |
| 2011/0105110 | A1 | 5/2011 | Carmon et al. |
| 2011/0222452 | A1 | 9/2011 | Jeong et al. |
| 2012/0087306 | A1 | 4/2012 | Kim et al. |
| 2012/0176923 | A1 | 7/2012 | Hsu et al. |
| 2012/0178482 | A1 | 7/2012 | Seo |
| 2012/0309394 | A1 | 12/2012 | Radulescu et al. |
| 2013/0176874 | A1 | 7/2013 | Xu et al. |
| 2013/0322364 | A1 | 12/2013 | Tsai |
| 2013/0322374 | A1 | 12/2013 | Cai et al. |
| 2014/0036786 | A1 | 2/2014 | Kazmi et al. |
| 2014/0241285 | A1 | 8/2014 | Pang et al. |
| 2014/0256322 | A1 | 9/2014 | Zhou |
| 2015/0011229 | A1 | 1/2015 | Morita et al. |
| 2015/0018028 | A1 | 1/2015 | Uplenchwar et al. |
| 2015/0057011 | A1 | 2/2015 | Di Girolamo et al. |
| 2015/0110023 | A1 | 4/2015 | Pan et al. |
| 2015/0119098 | A1 | 4/2015 | Hsu et al. |
| 2015/0244487 | A1 | 8/2015 | Zhou et al. |
| 2017/0064638 | A1 | 3/2017 | Li et al. |
| 2017/0164375 | A1 | 6/2017 | Sundararajan et al. |
| 2017/0188314 | A1 | 6/2017 | Mueck et al. |
| 2017/0215228 | A1 | 7/2017 | Radulescu et al. |
| 2018/0013594 | A1 | 1/2018 | Mukkavilli et al. |
| 2018/0376429 | A1 | 12/2018 | Islam et al. |
| 2019/0045457 | A1 | 2/2019 | Islam et al. |
| 2019/0141639 | A1 | 5/2019 | Rahman |
| 2019/0165827 | A1* | 5/2019 | Churan ................. H04J 11/003 |
| 2019/0174576 | A1 | 6/2019 | Palat et al. |
| 2019/0191381 | A1 | 6/2019 | Zhang et al. |
| 2019/0230597 | A1 | 7/2019 | Akkarakaran et al. |
| 2019/0261234 | A1 | 8/2019 | Park et al. |
| 2019/0297583 | A1 | 9/2019 | Lin |
| 2020/0229107 | A1* | 7/2020 | Venkatasubramanian ................... H04W 52/243 |

OTHER PUBLICATIONS

Non-Final Office Action received for U.S. Appl. No. 16/388,769 dated Nov. 29, 2019, 46 pages.

Non-Final Office Action received for U.S. Appl. No. 16/929,213 dated Jan. 6, 2021, 46 pages.

\* cited by examiner

UPLINK INTERFERENCE AVOIDANCE UNDER OPEN LOOP POWER CONTROL CONDITIONS

TECHNICAL FIELD

This disclosure relates generally to a wireless communication system in general, and to a fifth generation (5G) wireless communication systems power control. More specifically, facilitating uplink interference avoidance under open loop power control conditions.

BACKGROUND

5th generation (5G) wireless systems represent a next major phase of mobile telecommunications standards, also called new radio (NR) access, beyond the current telecommunications standards of $4^{th}$ generation (4G). In addition to faster peak Internet connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption, and lower latency than 4G equipment.

In wireless systems it is often required to either increase or decrease the transmit power of UE or mobile device. This is known as uplink power control. Transmit power is increased to meet required SNR or BER at the gNB (or base station or eNB). Transmit power is decreased to minimize co-channel interference of the 5G system. There are two types of power controls, e.g., open loop power control and closed loop power control.

In a wireless system that is operating adjacent or within a vicinity of an external system, it is often required to adjust uplink power control (e.g., transmit power) to maintain interference requirement. Transmit power is decreased to lower a co-channel interference on a 5G system or other systems (e.g., government communication system adjacent to the 5G system). There are two types of power controls (e.g., open loop power control and closed loop power control). An open loop power control does not use feedback between base station and mobile station to adjust transmit power the mobile station. The closed loop power control uses a feedback between the base station and mobile station to adjust the transmit power of mobile station.

The above-described background relating to facilitating uplink interference avoidance under open loop power control conditions is merely intended to provide a contextual overview of some current issues and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
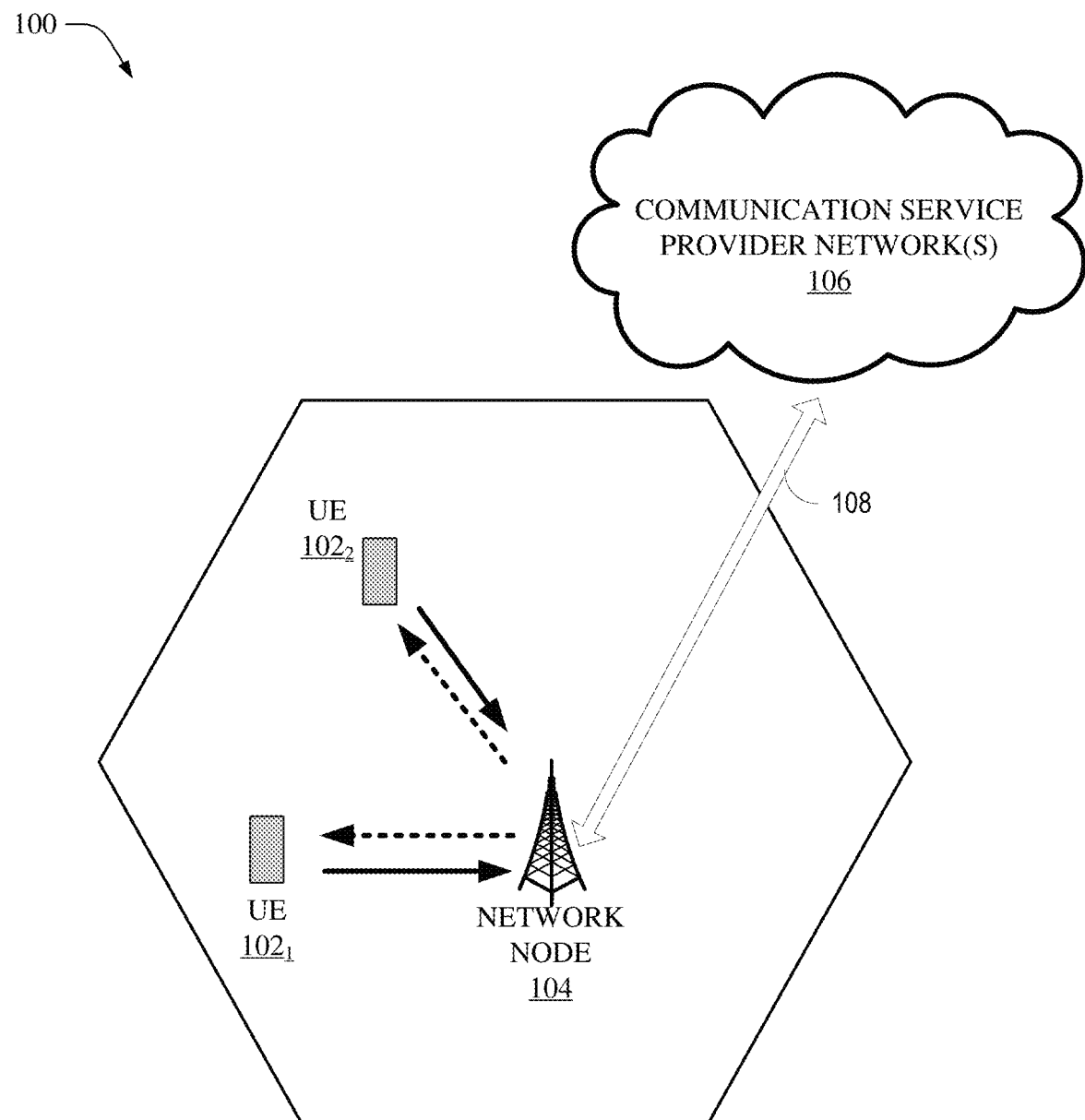
FIG. 1 illustrates a non-limiting example of a wireless communication system in accordance with various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate a discontinuous access to unlicensed spectrum in a new radio access environment. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate a discontinuous access to unlicensed spectrum in a new radio access environment. Facilitating a discontinuous access to unlicensed spectrum can be implemented in connection with any type of device with a connection to the communications network (e.g., a mobile handset, a computer, a handheld device, etc.) any Internet of things (TOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles, etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception.

In some embodiments the non-limiting term radio, network node, or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, remote radio unit (RRU), remote radio head (RRH), nodes in distributed antenna system (DAS), relay device, network node, node device, etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with or take the place of policy and charging rules function ("PCRF") network elements so that policies such as quality of service and traffic management and routing can be synchronized and managed end to end.

The Federal Communications Commission (FCC) reallocated the 1755-1780 MHz band for Advanced Wireless Services (AWS). The rules provide commercial access to new spectrum bands through a spectrum-sharing arrangement with incumbent federal users in accordance with the procedures set forth by the FCC and the National Telecommunications and Information Administration (NTIA). The commercial systems operating in the AWS-3 band are expected to employ LTE (3GPP Release 8+). Protection Zones were defined as areas where Federal Services (e.g., Satellites) have been deployed. US wireless operators should limit their Wireless AWS-3 services in protection zones to avoid interference with federal services.

In some embodiments, wireless systems can use Open Loop Power Control (OLPC) and Closed Loop Power Control (CLPC) to control UE uplink power control. According to some embodiments, according to OLPC, UE determines its transmission power by its own power setting algorithm. This power setting algorithm takes in many inputs, which includes UE internal setting and UE measurements. There is no feedback input from eNB. According to some embodiments, according to (CLPC), similar mechanism may be employed by OLPC to determine the initial power that UE needs to communicate with the eNB. Then, UE transmission power is controlled dynamically by some feedback input from eNB. eNB feedback is known as Transmission Power Control (TPC) commands.

In some embodiments, UE transmission power changes dynamically based on various factors, for example but not limited to:
1. Assigned MCS; UE assigned to poor MCS (QPSK) may needs higher TX power than one assigned to good MCS (64QAM);
2. UE traffic demand; UE engaged in heavy traffic (e.g., HD video conference) may need higher TX power than one engaged in light traffic (e.g., voice call);
3. Network Morphology; UE located in Urban environment may require higher TX power than one locate in a rural environment;
4. Network design; UE located in a network with large Inter-Site-Distance may require higher TX power;
5. Power Control and OLPC/CLPC settings; and/or
6. Path loss between the UE and base station, which can vary according to frequency, distance, objects in the path and the composition of objects in the path.

In some embodiments, the algorithm used for OLPC is:

$$P_{PUSCH} = \min\{P_{max}, 10 \cdot \mathrm{Log}_{10} M + P_0 + \alpha * PL + \delta_{mcs}\} \text{ [dBm]}.$$

In some embodiments, the algorithm used for CLPC is:

$$P_{PUSCH} = \min\{P_{max}, 10 \cdot \mathrm{Log}_{10} M + P_0 + \alpha * PL + \delta_{mcs} + f(\Delta_i)\} \text{ [dBm]}$$

In some embodiments, LTE UE transmit power for PUSCH (channel or Physical Uplink Shared Channel) is defined as:

$$P_{PUSCH} = \min\{P_{max}, 10 \cdot \mathrm{Log}_{10} M + P_0 + \alpha * PL + \delta_{mcs} + f(\Delta_i)\} \text{ [dBm]}$$

wherein, $P_{PUSCH}$: Power that the UE uses to transmit user data in the uplink channel.

$P_{max}$: Maximum allowed transmit power (23 dbm)

M: # of physical resource blocks (PRB) utilized to transmit UE data;

$P_0$: Cell/UE-specific parameter signaled by the radio resource control (RRC). Typical value of $P_0 = -90$ dbm $\alpha$: Path loss compensation factor. $\alpha$ is in the range [0 1] and signaled by the RRC. Typical value of $\alpha = 0.8$ PL: Downlink path loss estimate by UE based on the measured and reported RSRP.

$\delta_{mcs}$: a UE-specific MCS-dependent power offset. It reflects the different SINR requirements per MCS.

$f(\Delta_i)$: UE specific, aka TPC. TPC (Transmit Power Control) is a closed loop correction value. It is used to compensate variations on the signal and interference powers in order to guarantee a desirable communication quality level.

$$P_0 = \alpha*(SNR_o + P_n) + (1-\alpha)*(P_{max} - 10 \cdot Log_{10} M_o)[dBm]$$

where;

$SNR_o$ is the is the open-loop target SNR.

$P_n$ is the noise power per PRB.

$M_o$ defines the number of PRBs for which the SNR target is reached with full power.

In some embodiments, eNB uses Power Headroom Report (PHR) sent by the UE to estimate how much transmission power is left for a UE to use, wherein the PHR=UE Max Transmission Power—PUSCH Power. In some embodiments, PHR are sent periodically based on a timer.

In some embodiments, the eNBs mandate that the maximum UL LTE power that UEs can use (P_MAX). For example, the maximum allowed P_MAX may be 23 dbm. PMAX value comes in the System Information Block Type 1 (SIB1) messages, which is broadcast to all UEs periodically. However, UE only read SIB1 during the initial attach (e.g., establishing the initial communication link with eNB) procedure. In some embodiments, when eNB needs to notify network/setting changes to its UEs, the eNB transmits a paging message with systemInfoModification=true. Thereafter, the eNB transmits an updated SIB1 (e.g., P_MAX=20 dbm). The Paging message is used to inform UEs in RRC IDLE and UEs in RRC_CONNECTED about a system information change. UE then reads and decodes the new SIB1 message and change its setting accordingly.

In some embodiments, a commercial LTE system uses OLPC as UE uplink transmit power control mechanism and a centralized control element, such as self-organized network (SON) to collect network measurements and control network elements (e.g., eNB, MME, SGW). In some embodiments, the SON is a network intelligence and automation platform used to improve deployment and performance in complex LTE networks. Also, SON is a part of the 3GPP Release 8+ standards.

In some embodiments, a system to reduce LTE Uplink interference into an external system that shares the same UL frequency band is described herein. In some embodiments, a system is provided that resides in a centralized network element (such as SON). The system has knowledge of LTE network topology information and location of the external (e.g., DoD) system. The system selects a group of eNB in the vicinity of the external system which may create UL interference. The system collects measurements, key-performance-indicators and/or settings corresponding to these eNBs. The system also collects corresponding traffic profile, and user behavior from other network elements (e.g., Deep Packet Inspection (DPI)) for the UEs connected to these eNBs. The system also estimates the total LTE UL interference into the external system, based on propagation models and the estimated amount of UE UL Transmit Power from the steps above. The system further enforces eNBs to reduce the P_MAX of all the UEs attached by sending paging messages and new SIB1 messages to reduce LTE interference based on estimated total LTE UL interference generated into external system, while maintaining UE quality of experience.

In some embodiments, Aggregated UL power from all the UEs connected to $eNB_j$:

$$ULPower_{eNB_j} = \Sigma ULPower_{UE_i}$$

wherein that $ULPower_{eNB_j}$ represents the concurrent UL power of all UEs connected to $eNB_j$ (UEs engaged into UL traffic simultaneously). In some embodiments, the total UL aggregated interferences received at external system from all eNBs nearby can be calculated by:

$$TotalULAggregatedInterference = \Sigma Interference_{eNB_j}$$

wherein the $Interference_{eNB_j}$ is the radio propagation model (e.g., Hata Model) of $ULPower_{eNB_j}$ into the external system.

In some embodiments, a method is provided to calculate the interference, the method can estimate the eNBs that may create UL interference into external system based on location. The method can collect UL power settings from the eNBs. The method can collect PHR for all active UE connected to the eNBs. The method can collect radio information (e.g., MCS, RSRP, RSRQ) from all active UEs connected to the eNBs. The method can collect traffic profile information (e.g., traffic information=video), and QoS information from the active UEs connected to the eNBs. The method can estimate average $ULPower_{eNB_j}$ using info collected above. The method can calculate TotalULAggregatedInterference into the external system based on propagation models. If TotalULAggregatedInterference is greater than maximum acceptable value and network is using OLPC for UL power control, then the method can rank eNBs based on $ULPower_{eNB_j}$, and UE Profile/QoS. The method can determine the new P_MAX for each eNB aiming to reduce TotalULAggregatedInterference, while maintaining appropriate user experience. In some embodiments, as an example, where a large percentage of UEs attached to eNB1 are engaged into High-QoS applications (e.g., Video Conference), the eNB1 is generating large $ULPower_{eNB_j}$. Where a low percentage of UEs attached to eNB2 are engaged into High-QoS applications (e.g., Video Conference), eNB2 is generating $ULPower_{eNB_j}$. In such case, according to an embodiment, the method can decide to reduce P_MAX to 22 dbm (from 23 dbm) for eNB1, and reduce P_MAX to 10 dbm (from 23 dbm) for eNB2. In another example, where a large number of UEs are attached to eNB1, the eNB1 is generating large $ULPower_{eNB_j}$. Where a low number of UEs are attached to eNB2, eNB2 is generating small $ULPower_{eNB_j}$. In such case, according to an embodiment, the method can decide to increase P_MAX to 23 dbm (from 22 dbm) for eNB2. The method can send the new P_MAX to each eNB and each eNB can broadcast the new SIB1 to all its UEs. The method can adjust P_MAX values for each eNB based on observation (UL power and UE traffic profiles).

In some embodiments, an interference aware UL scheduling may be employed in addition or in combinations with techniques discussed above, to further to reduce the interference into external system. In some embodiments, according to interference aware UL scheduling, the eNB measures the interference plus noise power distribution over the PUSCH spectrum. In some embodiments, based on these measurements the interference aware UL scheduler can arrange the UL PRB allocation of the UEs in the frequency domain so that the interference to the adjacent external system is optimized. This technique can help to offset the impact of UE transmit power limitations by placing power-limited UE transmissions on the PUSCH PRBs with the least uplink interference (therefore least UE power required). In some embodiments, traffic management may be employed, wherein traffic management techniques involve handover of some UEs to other frequency bands. UE selection for inter-frequency handover is based on the amount of transmit power that UE is emitting. For example, using interference aware UL scheduling to arranges the UL PRB allocation of the UEs in a way to reduce interference to external system (to the extent possible). In some embodiments, if this solution cannot guarantee a maximum allowed interference (e.g., reduction of interference below a maximum interference threshold) into external system, then system can use the proposed OLPC algorithm (described above) to further reduce the interference into external system based on independent SIB1 messages (with different P_MAX values) broadcast form each eNB to all its connected UEs. In some embodiments, if this solution cannot guarantee a maximum allowed interference into external system, the system can use traffic management techniques to handover heavy UEs (high UL-TX) to other frequency bands. Occasionally, the eNB may detect high interference on the PRB. This may be due to interference from the adjacent external system (e.g., reciprocal interference from DOD ground station). In some embodiments, reciprocal interference can be bi-directional. In some embodiments, where there are two directional antennas aimed at the same point, for example, if site 1 is receiving high interference on some frequencies from site 2 (e.g. an external DOD site), then there is a high probability that site 1 UE (e.g., using the same frequencies as site 2) are likely to interfere with site 2. In such a case, if site 1 receives high interference (e.g., from the external DOD system) on some frequencies, then the site 1 UE should use less power on the same frequencies, thereby limiting risk of reciprocal interference to the DOD site.

In some embodiments, additional methods may be employed to reduce interference into the external systems. For example, the system can use of AWS-3 carrier as downlink-only S-cell (secondary cell-CA) at LTE cells where/when DoD interference is predicted and UE_PMAX is reduced. In this case the AWS-3 downlink is useable to cell edge even if the AWS-3 uplink UE power is reduced.

In some embodiments, additional methods may be employed to reduce interference into the external systems. For example, the system can use Multi-eNB cluster detection and mitigation. For example, for a constellation of eNBs surrounding the DOD ground station, each with uplink interference received (at different azimuth and level) from the ground station. The level and direction of received uplink interference can be used to triangulate the DOD ground station, general area and serving eNB with LTE UE to ground station interference risk. This creates a list of eNB serving UE within an "interference zone" around the DOD ground station. These eNB are likely handover neighbors to each other, which means served UE are measuring relative path loss for handovers between these eNB. This relative path loss (from UE handover measurements) can be used to determine when/if the UE is located in the "interference zone" and therefore subject to power restriction, forced handover to other non-interfering frequency band and/or use of AWS-3 as downlink-only S-cell. This capability will require additional logic in the UE and SIB from the eNB. In some embodiments, the TotalULAggregatedInterference can be mathematically estimated as shown above. However, TotalULAggregatedInterference can also be estimated by means of power reading from eNB/UE. In some embodiments, the system can estimate the eNBs serving UE that may create UL interference into external system based on location and reciprocal uplink interference from the external system ground stations to the eNB. This addresses the reality that it's the served UE (not the eNB) that may create interference for external systems (e.g., DOD ground stations). This also includes the use of eNB uplink noise measurements to estimate path loss (therefore interference probability of UE served by the eNB) to the DOD ground station. This reciprocal uplink interference/path loss check is an additional qualifier for eNBs that need to apply interference mitigation algorithms for their served UE. In some embodiments, the solutions described above may be extended to be used on both FDD and TDD technologies In some embodiments, interference aware UL scheduling is a type of 3GPP Frequency Selective Scheduling (FSS). FSS leverages the channel's time and frequency selectivity to allocate valuable radio resources in an optimal manner. With interference aware UL scheduling the eNodeB provides improved cell edge performance in UL for low loaded cells. In some embodiments the eNodeB measures the interference plus noise power distribution over the PUSCH spectrum and evaluates the TX power density measurements of the UEs. On basis of these measurements the interference aware UL scheduler arranges the PUSCH (Physical Uplink Shared Channel) PRB allocation of the UEs in the frequency domain so that the resource allocation or rather the interference to the adjacent cells is optimized without the means of eNodeB intercommunication via X2. The separation is achieved by assigning the UEs which have huge TX power density to the PUSCH scheduling area which is less affected by interference and noise. In some embodiments, the interference aware UL scheduling is the separation of the PRB allocation in the adjacent cells, in particular the separation of the PRB from UEs generating huge intercell interference. The PUSCH is split into PUSCH scheduling areas of approximately equal size. The scheduler defines the best PUSCH scheduling area with respect to the average interference and noise power. For the selection of the preferred scheduling area, the interference aware UL scheduler evaluates the interference and noise power which is measured per PRB by the physical layer (Layer 1) of the eNodeB. In some embodiments, the power headroom report (PHR) and finally the number of PRBs which are involved by the UL transmission give the information about the TX power density the UE provides for the UL transmission. The power density increases proportionally to the distance from the eNodeB and achieves the maximum when the UE is close to the cell edge (the higher the power density the higher the intercell interference the UE contributes to the adjacent cells), thus, the power density provides the parameter the interference aware scheduler requires for the scheduling of the UEs in the frequency domain. The UEs with a higher TX power density are assigned to the preferred scheduling area and the UEs with a lower TX power density are placed in the remaining PUSCH area.

According an embodiment, a system can comprise a processor and a memory that stores executable instructions that, when executed by the processor, can facilitate performance of operations comprising identifying network node devices and communication devices operating within a boundary located adjacent to an external system. The system can further facilitate determining communication settings of the communication devices that are engaged in an uplink session with the network node devices. The system can further facilitate estimating a total uplink interference into the external system based on a propagation model and an uplink power control value determined from the communication settings. The system can further facilitate, in response to determining that the total uplink interference is greater than a defined value and in response to determining that the network node devices employed an open loop power control, requesting the network node devices to initiate an update to an uplink power limit (e.g., uplink power control setting or P_MAX) of the communication devices engaged in the uplink session with the network node devices.

According to another embodiment, described herein is a method that can comprise identifying, by a system comprising a processor, network node devices and communication devices operating within a boundary located adjacent to an external system, wherein the network node devices share an uplink frequency with the external system. The method can further comprise receiving, by the system, communication settings of the communication devices that are communicatively connected to the network node devices having an active uplink session. The method can further comprise estimating, by the system, an aggregated uplink interference into the external system based on a propagation model and an uplink power control value determined from the communication settings. The method can further comprise in response to determining that the aggregated uplink interference is greater than a maximum interference value and in response to determining that the network node devices are operating according to an open loop power control, requesting, by the system, the network node devices to facilitate uplink power reduction of the communication devices.

According to yet another embodiment, machine-readable storage medium, comprising executable instructions that, when executed by a processor, facilitate performance of operations, identifying a group of network node devices and communication devices operating within a boundary located adjacent to an external system, wherein the external system and the group of network node devices share an uplink frequency. The machine-readable storage medium can further comprise receiving communication settings of the communication devices that are communicatively connected to the group of network node devices having an active uplink session. The machine-readable storage medium can further comprise estimating an average uplink interference into the external system based on a propagation model and an uplink power control value calculated from the communication settings of the communication devices that are communicatively connected to the group of network node devices. The machine-readable storage medium can further comprise in response to determining that the average uplink interference is greater than a defined interference value and in response to determining that the group of network node devices that operate an open loop power control, requesting, the group of network node devices to send a paging message to facilitate an update to an uplink power limit of the communication devices.

These and other embodiments or implementations are described in more detail below with reference to the drawings.

FIG. 1 illustrates a non-limiting example of a wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment (UE) 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosure, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, millimeter wave networks and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR)

systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are planned for use in 5G systems.

Figure 2:
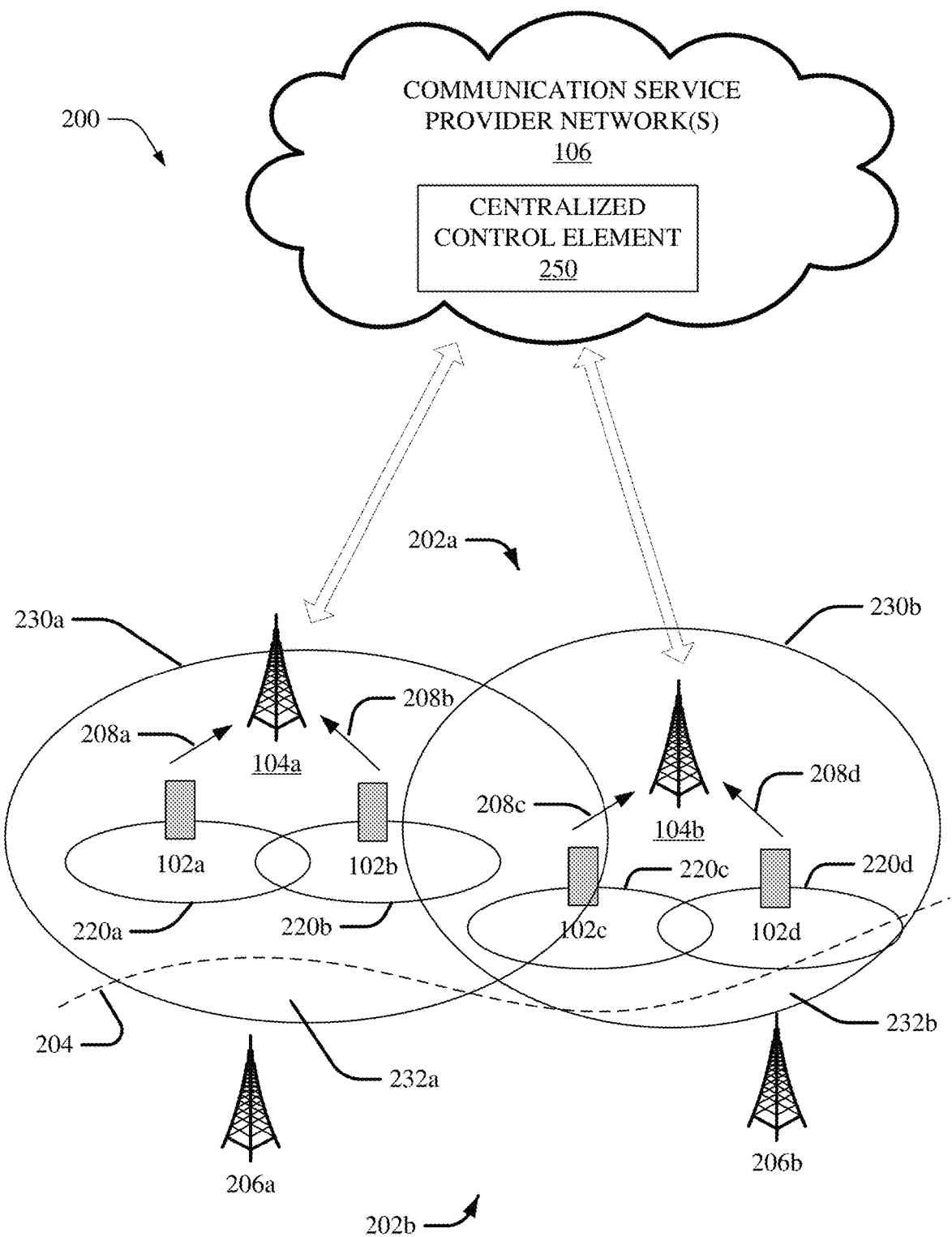
FIG. 2 illustrates a non-limiting example of a wireless communication system in accordance with various aspects and embodiments of the subject disclosure.

FIG. 2 illustrates a non-limiting example of a wireless communication system 200 in accordance with various aspects and embodiments of the subject disclosure. In some embodiments, the system 200 can comprise a centralized control element 250 that can be integrated with other components of the communication service provider networks 106. As illustrated, the system comprises a commercial wireless system 202a and an external system 202b (e.g., government system). The commercial wireless system 202a is adjacent to the external system 202b separated by a dashed line 204. In the exemplary illustration, the external system 202b is located in a protected area comprising an eNB-A 206a and an e-NB-B 206b. In some embodiments, as an example, the commercial wireless system 202a comprises the e-NB-1 104a that is communicatively connected and engaged a UE-1 102a and a UE-2 102b, and the e-NB-2 104b that is communicatively connected and engaged with a UE-3 102c and a UE-4 102d. In some embodiments, the UE-1 102a is engaged with the eNB-1 104a using an uplink transmission link 208a that is generating an inference covering area defined by an interference area A 220a; the UE-2 102b is engaged with the eNB-1 104a using an uplink transmission link 208b that is generating an inference covering area defined by an interference area B 220b; the UE-3 102c is engaged with the eNB-2 104b using an uplink transmission link 208c that is generating an inference covering area defined by an interference area C 220c; and the UE-4 102d is engaged with the eNB-2 104b using an uplink transmission link 208d that is generating an inference covering area defined by an interference area D 220d. In some embodiments, total interference generated by eNB-1 is illustrated by an interference area E 230a and total interference generated by eNB-2 is illustrated by an interference area F 230b. As illustrated, area A 232a and area B 232b, the interference area E and the interference area F 230b are extended into the protected area (e.g., external system 202b), respectively. In some embodiment, the centralized control element 250 can facilitate reduction of total inference into the external system 202b by executing various methods described herein.

Figure 3:
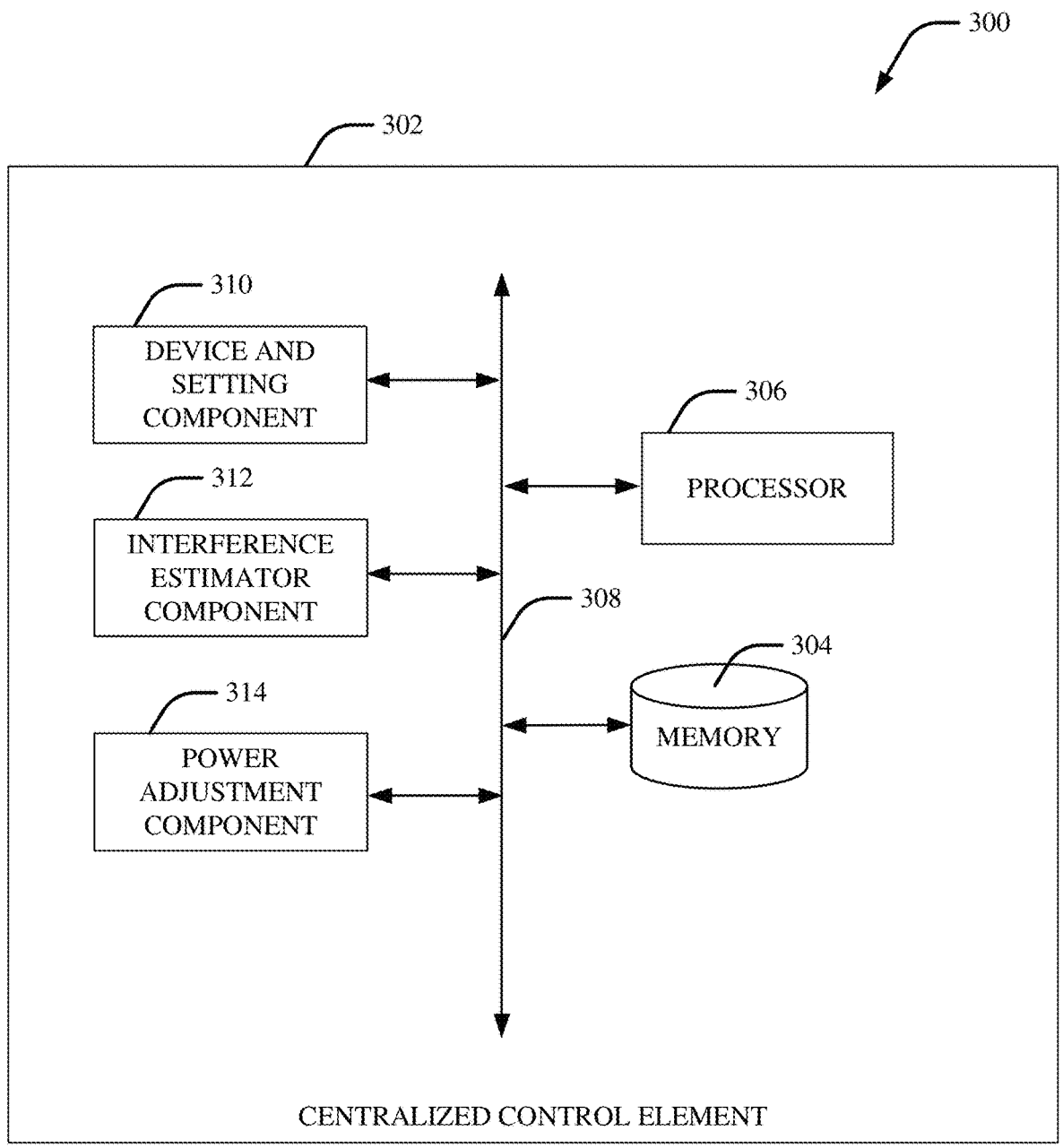
FIG. 3 illustrates a block diagram of an example, non-limiting system that facilitates operation of uplink interference avoidance under open loop power control conditions in accordance with one or more embodiments described herein.

FIG. 3 illustrates a block diagram of an example, non-limiting system 300 that facilitates operation of uplink interference avoidance under open loop power control conditions in accordance with one or more embodiments described herein. Repetitive description of like elements employed in respective embodiments is omitted for sake of brevity. According to some embodiments, the system 300 can comprise a centralized control element 302. In some embodiments, the centralized control element 302 can also include or otherwise be associated with a memory 304, a processor 306 that executes computer executable components stored in a memory 304. The centralized control element 302 can further include a system bus 308 that can couple various components including, but not limited to, a device and setting component 310, an interference estimator component 312, and a power adjustment component 314.

Aspects of systems (e.g., the centralized control element 302 and the like), apparatuses, or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

It should be appreciated that the embodiments of the subject disclosure depicted in various figures disclosed herein are for illustration only, and as such, the architecture of such embodiments are not limited to the systems, devices, and/or components depicted therein. For example, in some embodiments, the centralized control element 302 can comprise various computer and/or computing-based elements described herein with reference to operating environment 1100 and FIG. 11. In several embodiments, such computer and/or computing-based elements can be used in connection with implementing one or more of the systems, devices, and/or components shown and described in connection with FIG. 3 or other figures disclosed herein.

According to several embodiments, the memory 304 can store one or more computer and/or machine readable, writable, and/or executable components and/or instructions that, when executed by processor 306, can facilitate performance of operations defined by the executable component(s) and/or instruction(s). For example, the memory 304 can store computer and/or machine readable, writable, and/or executable components and/or instructions that, when executed by the processor 306, can facilitate execution of the various functions described herein relating to the device and setting component 310, the interference estimator component 312, and the power adjustment component 314.

In several embodiments, the memory 304 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 304 are described below with reference to system memory 1106 and FIG. 11. Such examples of memory 304 can be employed to implement any embodiments of the subject disclosure.

According to some embodiments, the processor 306 can comprise one or more types of processors and/or electronic circuitry that can implement one or more computer and/or machine readable, writable, and/or executable components and/or instructions that can be stored on the memory 304. For example, the processor 306 can perform various operations that can be specified by such computer and/or machine readable, writable, and/or executable components and/or instructions including, but not limited to, logic, control, input/output (I/O), arithmetic, and/or the like. In some embodiments, processor 306 can comprise one or more central processing unit, multi-core processor, microprocessor, dual microprocessors, microcontroller, System on a Chip (SOC), array processor, vector processor, and/or another type of processor.

In some embodiments, the processor 306, the memory 304, the device and setting component 310, the interference estimator component 312, and the power adjustment component 314 can be communicatively, electrically, and/or operatively coupled to one another via the system bus 308 to perform functions of the centralized control element 302, and/or any components coupled therewith. In several embodiments, the system bus 308 can comprise one or more memory bus, memory controller, peripheral bus, external bus, local bus, and/or another type of bus that can employ various bus architectures.

In several embodiments, the centralized control element 302 can comprise one or more computer and/or machine readable, writable, and/or executable components and/or instructions that, when executed by the processor 306, can facilitate performance of operations defined by such component(s) and/or instruction(s). Further, in numerous embodiments, any component associated with the centralized control element 302, as described herein with or without reference to the various figures of the subject disclosure, can comprise one or more computer and/or machine readable, writable, and/or executable components and/or instructions that, when executed by the processor 306, can facilitate performance of operations defined by such component(s) and/or instruction(s). For example, the device and setting component 310, and/or any other components associated with the centralized control element 302 (e.g., communicatively, electronically, and/or operatively coupled with and/or employed by centralized control element 302), can comprise such computer and/or machine readable, writable, and/or executable component(s) and/or instruction(s). Consequently, according to numerous embodiments, the centralized control element 302 and/or any components associated therewith, can employ the processor 306 to execute such computer and/or machine readable, writable, and/or executable component(s) and/or instruction(s) to facilitate performance of one or more operations described herein with reference to the centralized control element 302 and/or any such components associated therewith.

In some embodiments, the centralized control element 302 can facilitate performance of operations related to and/or executed by the components of centralized control element 302, for example, the processor 306, the memory 304, the device and setting component 310, the interference estimator component 312, and the power adjustment component 314. For example, as described in detail below, the centralized control element 302 can facilitate: identifying (e.g. the device and setting component 310) network node devices and communication devices operating within a boundary located adjacent to an external system and determining (e.g., by the device and setting component 310) communication settings of the communication devices that are engaged in an uplink session with the network node devices; estimating (e.g., by, the interference estimator component 312) a total uplink interference into the external system based on a propagation model and an uplink power control value determined from the communication settings; and in response to determining that the total uplink interference is greater than a defined value and in response to determining that the network node devices employed an open loop power control, requesting (e.g., the power adjustment component 314) the network node devices to initiate an update to an uplink power limit (e.g., facilitate uplink power reduction) of the communication devices engaged in the uplink session with the network node devices.

In some embodiments, the device and setting component 310 can comprise one or more processors, memory, and electrical circuitry. In some embodiments, the device and setting component 310 can identify and select one or more eNB and/or UEs which may be creating UL interference that are operating within the vicinity of the external system. In some embodiments, the device and setting component 310 can collect various communication measurements, KPIs, and settings corresponding to these eNBs. In some embodiments, the device and setting component 310 can also collect corresponding traffic profile, and user behavior from other networks elements (e.g., DPI) for the UEs connected to these eNBs. The centralized control element 302 may use the collected to data from identified network node devices and communication devices to estimate total uplink aggregated interference.

In some embodiments, the interference estimator component 312, can comprise one or more processors, memory, and electrical circuitry. In some embodiments the interference estimator component 312 can estimate the total UL interference (e.g., LTE UL interference) into the external system, based on propagation models (discussed above) and the estimated amount of UE UL transmit power using the various data collected from eNB and/or UE. In some embodiments, the interference estimator component 312 can estimate the total UL interface periodically to insure the inference is adjusted be below an interference threshold negotiated with the operators of the external system. In an OLPC, the eNB does not have knowledge of power level that a UE transmitting. Thus, for estimating the total UL interference, the eNB assumes that the UE is transmitting at the maximum power (e.g., transmitting at P_MAX value).

In some embodiments, the power adjustment component 314 can comprise one or more processors, memory, and electrical circuitry. In some embodiments, the power adjustment component 314 can request eNBs to reduce the maximum UL transmission power (P_MAX value) that the given UE may utilize. If the wireless system has UEs that operated under OLPC, the eNB is required to transmit a paging message in order to adjust the P_Max value of a given UE. In some embodiments, eNB can request an adjustment to the power setting for all the UEs attached (e.g., communicatively connected to eNB) by sending paging messages and new SIB1 messages to reduce LTE interference based on estimated total LTE UL interference generated into external system. In some embodiments, when the total aggregated UL interference reaches above a threshold value for interference into the external system, the power adjustment component 314 initiates procedures to reduce interference. For example, in response to determining that the total uplink interference is greater than a defined value and in response to determining that the network node devices employed an open loop power control, the power adjustment component 314 can request the network node devices to initiate an update to an uplink power limit (e.g., facilitate uplink power reduction) of the communication devices engaged in the uplink session with the network node devices.

Figure 4:
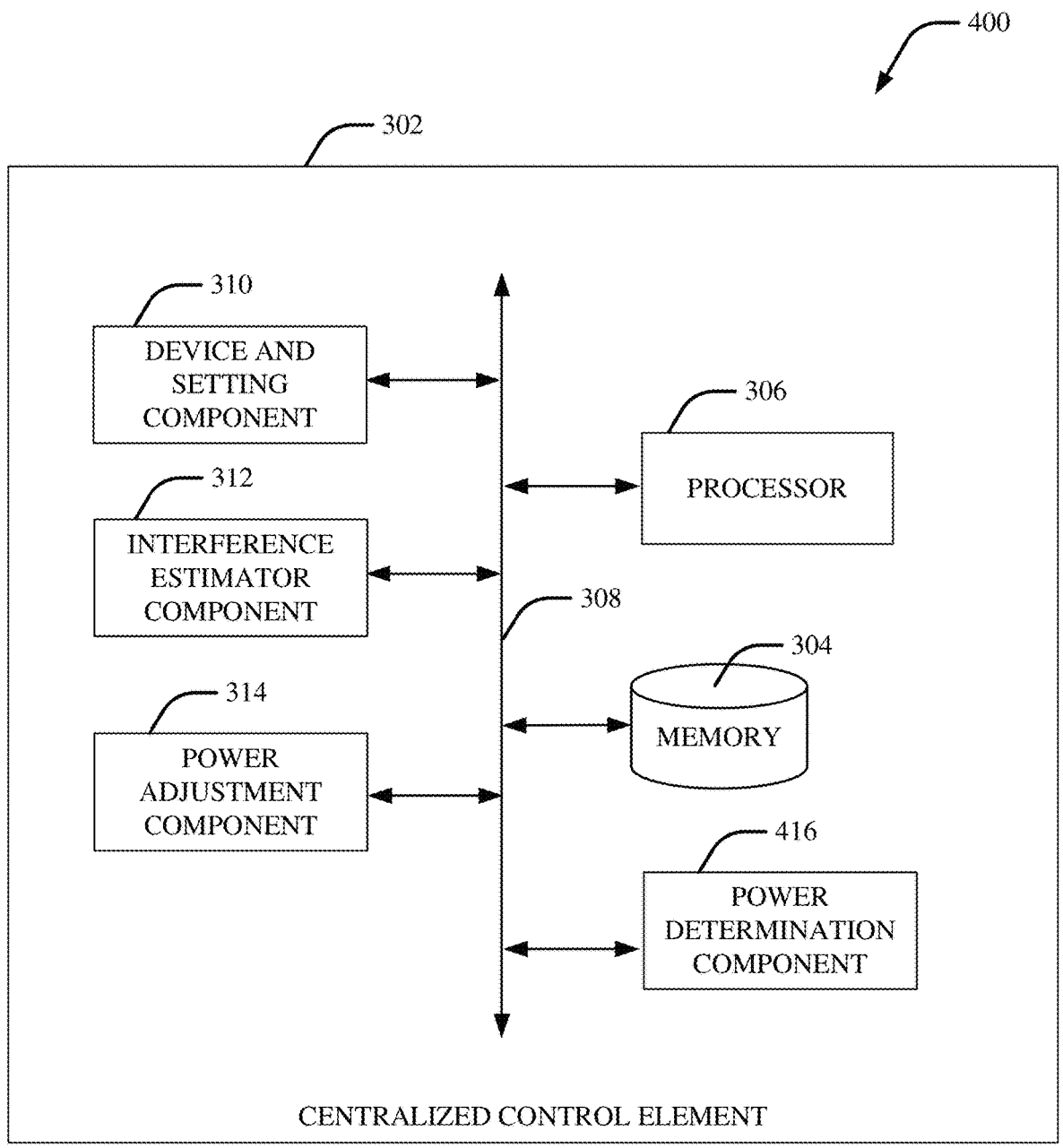
FIG. 4 illustrates a block diagram of an example, non-limiting system that facilitates uplink interference avoidance in accordance with one or more embodiments described herein.

FIG. 4 illustrates a block diagram of an example, non-limiting system 400 that facilitates uplink interference avoidance in accordance with one or more embodiments described herein. Repetitive description of like elements employed in respective embodiments is omitted for sake of brevity. According to several embodiments, the system 400 can comprise the centralized control element 302. In some embodiments, the centralized control element 302 can further comprise a power determination component 416. In some embodiments, the power determination component 416 can determine an updated maximum uplink power control value to use for the uplink power limit of the communication devices. In some embodiments, the power determination component 416 can further determine the update maximum uplink power control value based on a type of uplink communication in which the communication devices are engaged, and a quality of service assigned to the communication devices for the type of uplink communication. In some embodiments, the power determination component 416 can further determine the update maximum uplink power control value using a power headroom report, radio information, traffic information and quality of service information. For example, if the given UE (e.g., 102*a* of FIG. 2) maximum power control value is 23 (e.g., P_Max=23), the power determination component 416 can utilize various collected data and measurements to determine the updated maximum power control value to 20 (e.g., P_Max=20).

Figure 5:
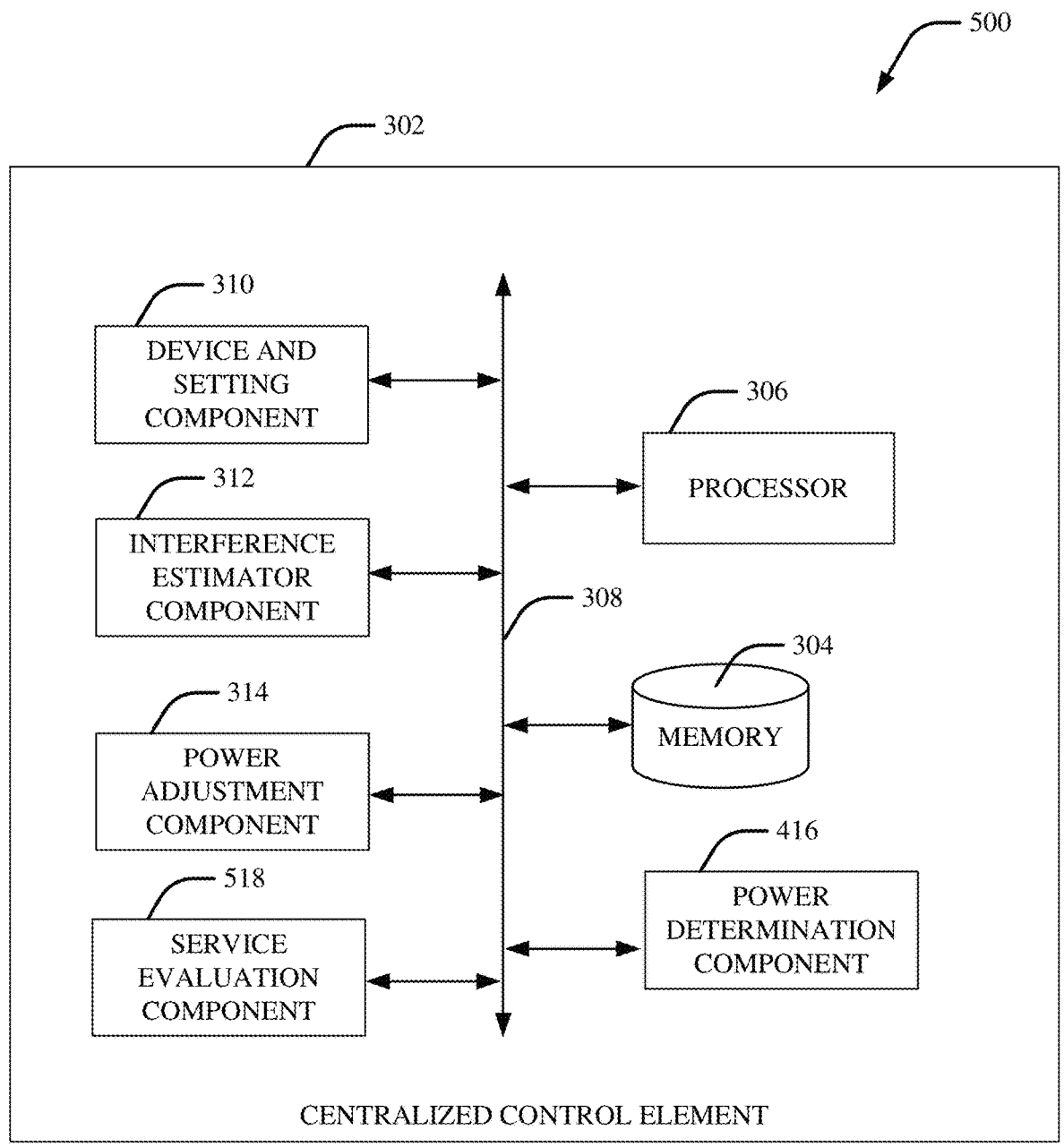
FIG. 5 illustrates a block diagram of an example, non-limiting system that facilitates uplink interference avoidance in accordance with one or more embodiments described herein.

FIG. 5 illustrates a block diagram of an example, non-limiting system 500 that facilitates uplink interference avoidance in accordance with one or more embodiments described herein. Repetitive description of like elements employed in respective embodiments is omitted for sake of brevity. According to several embodiments, the system 500 can comprise the centralized control element 302. In some embodiments, the centralized control element 302 can further comprise a service evaluation component 518. In some embodiments, service evaluation component 518 can evaluate the type services (e.g., FaceTime, video upload, photo upload, etc.) the UEs are engaged in to determine if lowering the maximum power control value would impact the usage experience. For example, if a UE is engaged in FaceTime service, then lowering the maximum power control can impact their experience. In some embodiments, service evaluation component 518 can evaluate a communication type and a quality of service assigned to the communication type to determine the updated maximum uplink power control value. In some embodiments, FaceTime may be given higher quality of service value that may cause the centralized control element 302 to select another UE to reduce UL transmit power.

Figure 6:
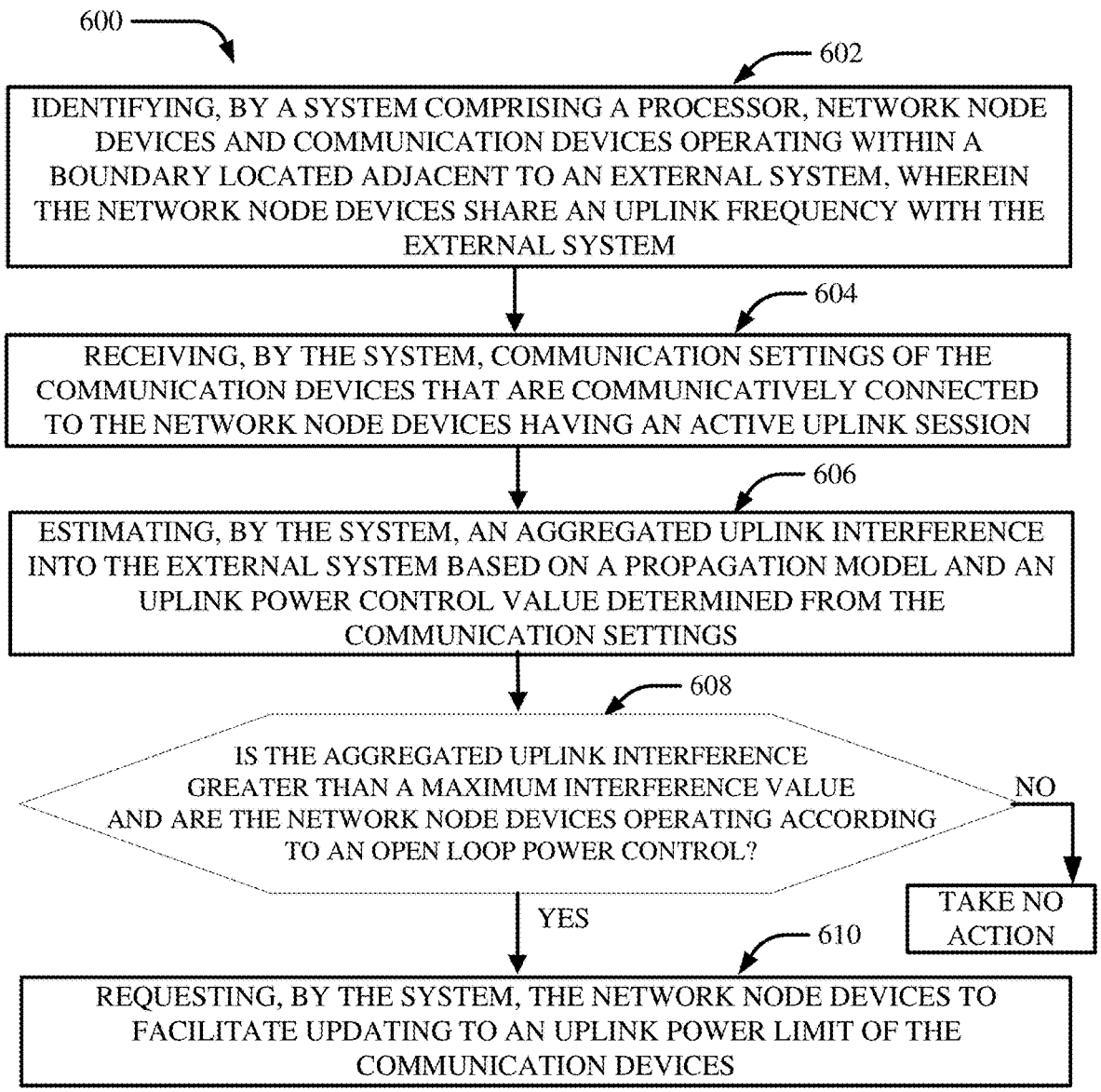
FIG. 6 depicts a diagram of an example, non-limiting computer implemented method that facilitates uplink interference avoidance under open loop power control conditions in accordance with one or more embodiments described herein.

FIG. 6 depicts a diagram of an example, non-limiting computer implemented method that facilitates uplink interference avoidance under open loop power control conditions in accordance with one or more embodiments described herein. Repetitive description of like elements employed in other embodiments described herein is omitted for sake of brevity. In some examples, flow diagram 600 can be implemented by operating environment 1100 described below. It can be appreciated that the operations of flow diagram 600 can be implemented in a different order than is depicted.

In non-limiting example embodiments, a computing device (or system) (e.g., computer 1102) is provided, the device or system comprising one or more processors and one or more memories that stores executable instructions that, when executed by the one or more processors, can facilitate performance of the operations as described herein, including the non-limiting methods as illustrated in the flow diagrams of FIG. 6.

Operation 602 depicts identifying, by a system comprising a processor, network node devices and communication devices operating within a boundary located adjacent to an external system, wherein the network node devices share an uplink frequency with the external system. Operation 604 depicts receiving, by the system, communication settings of the communication devices that are communicatively connected to the network node devices having an active uplink session. Operation 606 depicts estimating, by the system, an aggregated uplink interference into the external system based on a propagation model and an uplink power control value determined from the communication settings. Operation 608 depicts determining if the aggregated uplink interference is greater than a maximum interference value and are the network node devices are operating according to an open loop power control. If the aggregated uplink interference is greater than a maximum interference value and are the network node devices are operating according to an open loop power control, then perform operation 610. Otherwise, take no action and continue monitoring the connection. Operation 610 depicts, in response to determining that the aggregated uplink interference is greater than a maximum interference value and in response to determining that the network node devices are operating according to an open loop power control, requesting, by the system, the network node devices to facilitate updating to an uplink power limit (e.g., reducing uplink power limit) of the communication devices.

Figure 7:
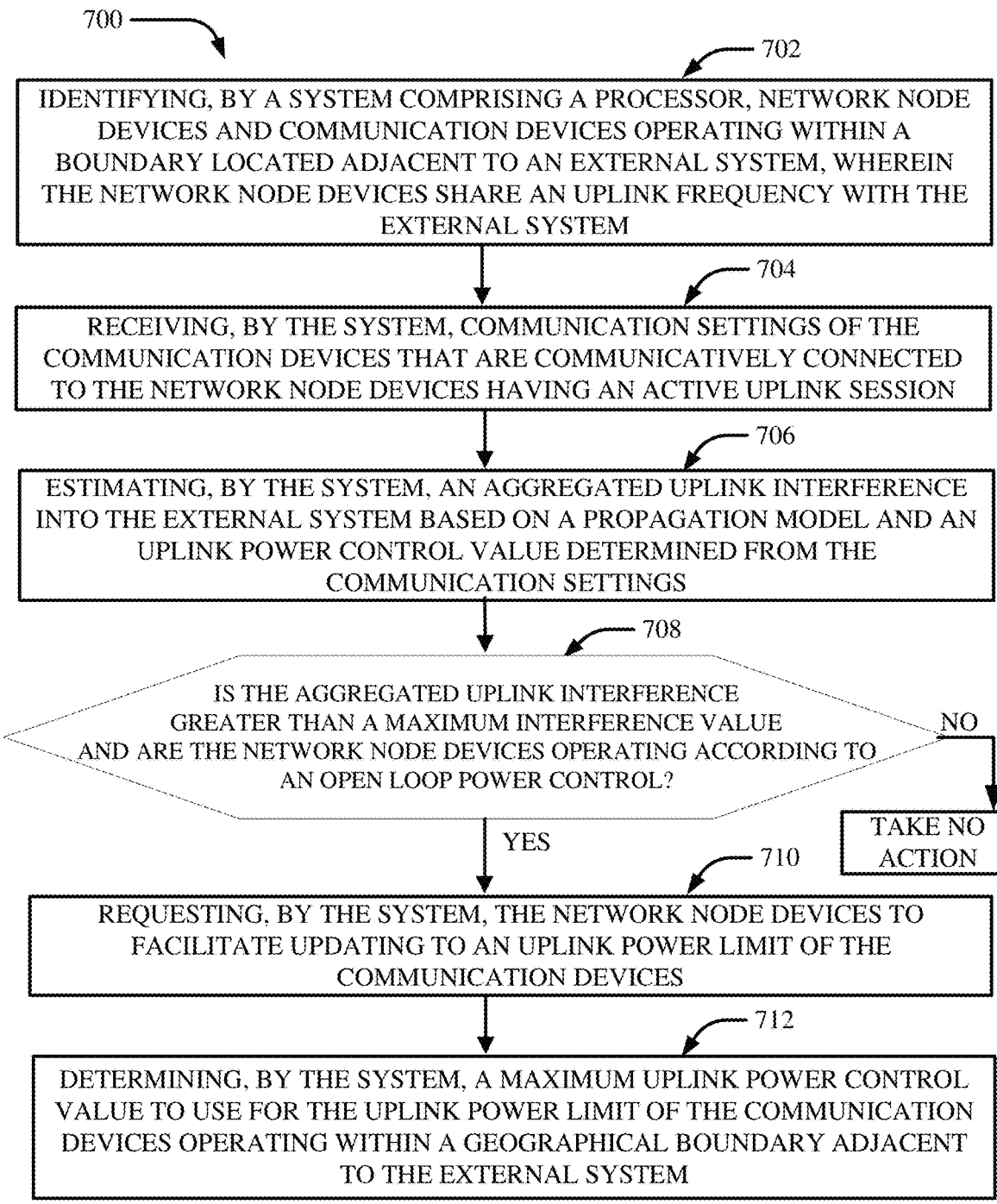
FIG. 7 depicts a diagram of an example, non-limiting computer implemented method that facilitates uplink interference avoidance under open loop power control conditions in accordance with one or more embodiments described herein.

FIG. 7 depicts a diagram of an example, non-limiting computer implemented method that facilitates uplink interference avoidance under open loop power control conditions in accordance with one or more embodiments described herein. Repetitive description of like elements employed in other embodiments described herein is omitted for sake of brevity. In some examples, flow diagram 700 can be implemented by operating environment 1100 described below. It can be appreciated that the operations of flow diagram 700 can be implemented in a different order than is depicted.

In non-limiting example embodiments, a computing device (or system) (e.g., computer 1102) is provided, the device or system comprising one or more processors and one or more memories that stores executable instructions that, when executed by the one or more processors, can facilitate performance of the operations as described herein, including the non-limiting methods as illustrated in the flow diagrams of FIG. 7.

Operation 702 depicts identifying, by a system comprising a processor, network node devices and communication devices operating within a boundary located adjacent to an external system, wherein the network node devices share an uplink frequency with the external system. Operation 704 depicts receiving, by the system, communication settings of the communication devices that are communicatively connected to the network node devices having an active uplink session. Operation 706 depicts estimating, by the system, an aggregated uplink interference into the external system based on a propagation model and an uplink power control value determined from the communication settings. Operation 708 depicts determining if the aggregated uplink interference is greater than a maximum interference value and are the network node devices are operating according to an open loop power control. If the aggregated uplink interference is greater than a maximum interference value and are the network node devices are operating according to an open loop power control, then perform operation 710. Otherwise, take no action and continue monitoring the connection. Operation 710 depicts, in response to determining that the aggregated uplink interference is greater than a maximum interference value and in response to determining that the network node devices are operating according to an open loop power control, requesting, by the system, the network node devices to facilitate updating to an uplink power limit (e.g., reducing uplink power limit) of the communication devices. Operation 712 depicts, in response to the determining that the aggregated uplink interference is greater than the maximum interference value and in response to the determining that the network node devices are operating according to the open loop power control, determining, by the system, a maximum uplink power control value to use for the uplink power limit of the communication devices operating within a geographical boundary adjacent to the external system.

Figure 8:
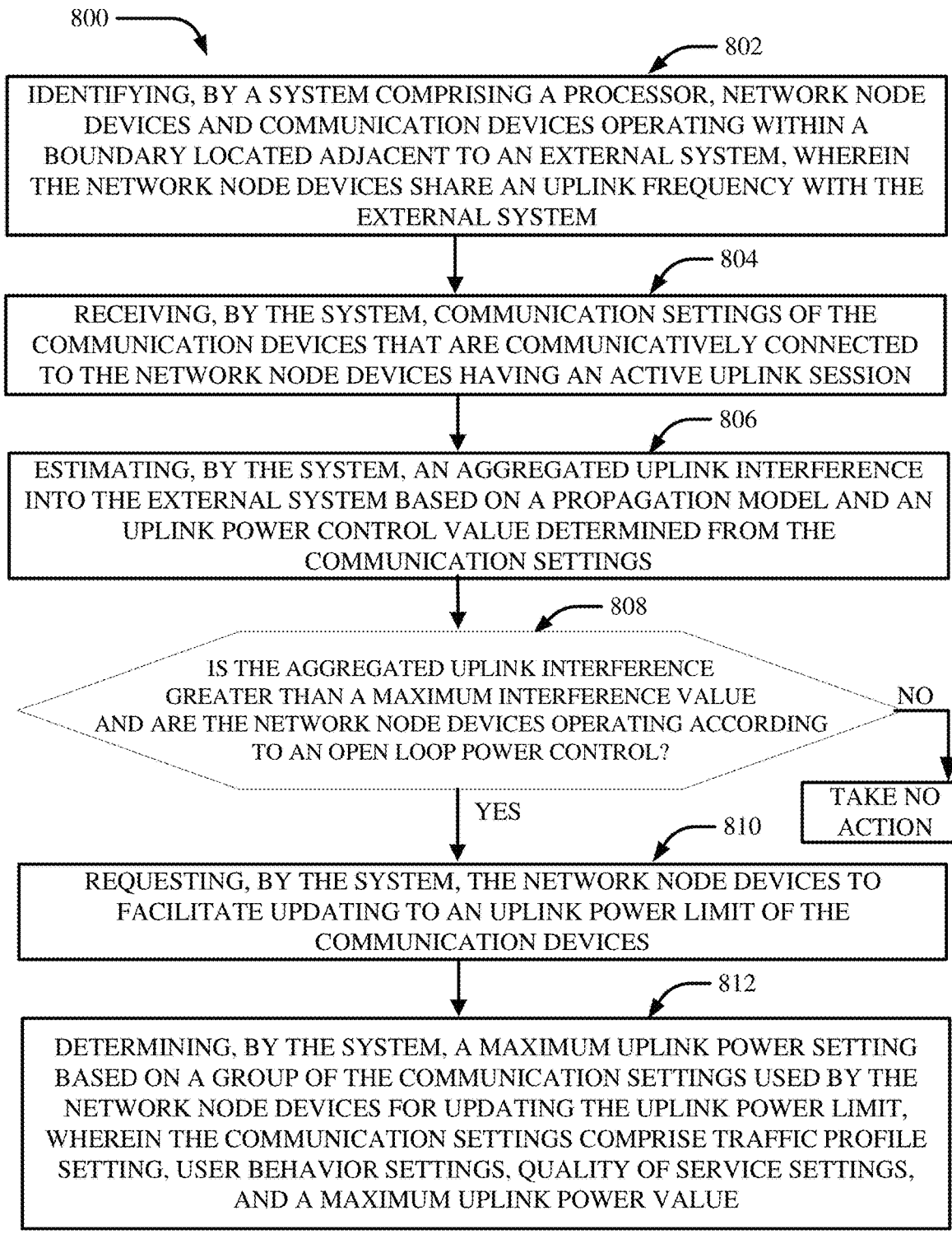
FIG. 8 depicts a diagram of an example, non-limiting computer implemented method that facilitates uplink interference avoidance under open loop power control conditions in accordance with one or more embodiments described herein.

FIG. 8 depicts a diagram of an example, non-limiting computer implemented method that facilitates uplink interference avoidance under open loop power control conditions in accordance with one or more embodiments described herein. Repetitive description of like elements employed in other embodiments described herein is omitted for sake of brevity. In some examples, flow diagram 800 can be implemented by operating environment 1100 described below. It can be appreciated that the operations of flow diagram 800 can be implemented in a different order than is depicted.

In non-limiting example embodiments, a computing device (or system) (e.g., computer 1102) is provided, the device or system comprising one or more processors and one or more memories that stores executable instructions that, when executed by the one or more processors, can facilitate performance of the operations as described herein, including the non-limiting methods as illustrated in the flow diagrams of FIG. 8.

Operation 802 depicts identifying, by a system comprising a processor, network node devices and communication devices operating within a boundary located adjacent to an external system, wherein the network node devices share an uplink frequency with the external system. Operation 804 depicts receiving, by the system, communication settings of the communication devices that are communicatively connected to the network node devices having an active uplink session. Operation 806 depicts estimating, by the system, an aggregated uplink interference into the external system based on a propagation model and an uplink power control value determined from the communication settings. Operation 808 depicts determining if the aggregated uplink interference is greater than a maximum interference value and are the network node devices are operating according to an open loop power control. If the aggregated uplink interference is greater than a maximum interference value and are the network node devices are operating according to an open loop power control, then perform operation 810. Otherwise, take no action and continue monitoring the connection. Operation 810 depicts, in response to determining that the aggregated uplink interference is greater than a maximum interference value and in response to determining that the network node devices are operating according to an open loop power control, requesting, by the system, the network node devices to facilitate updating to an uplink power limit (e.g., reducing uplink power) of the communication devices. Operation 812 depicts determining, by the system, a maximum uplink power limit (e.g. maximum uplink power setting) based on a group of the communication settings used by the network node devices for updating the uplink power limit, wherein the communication settings comprise traffic profile setting, user behavior settings, quality of service settings, and a maximum uplink power value.

Figure 9:
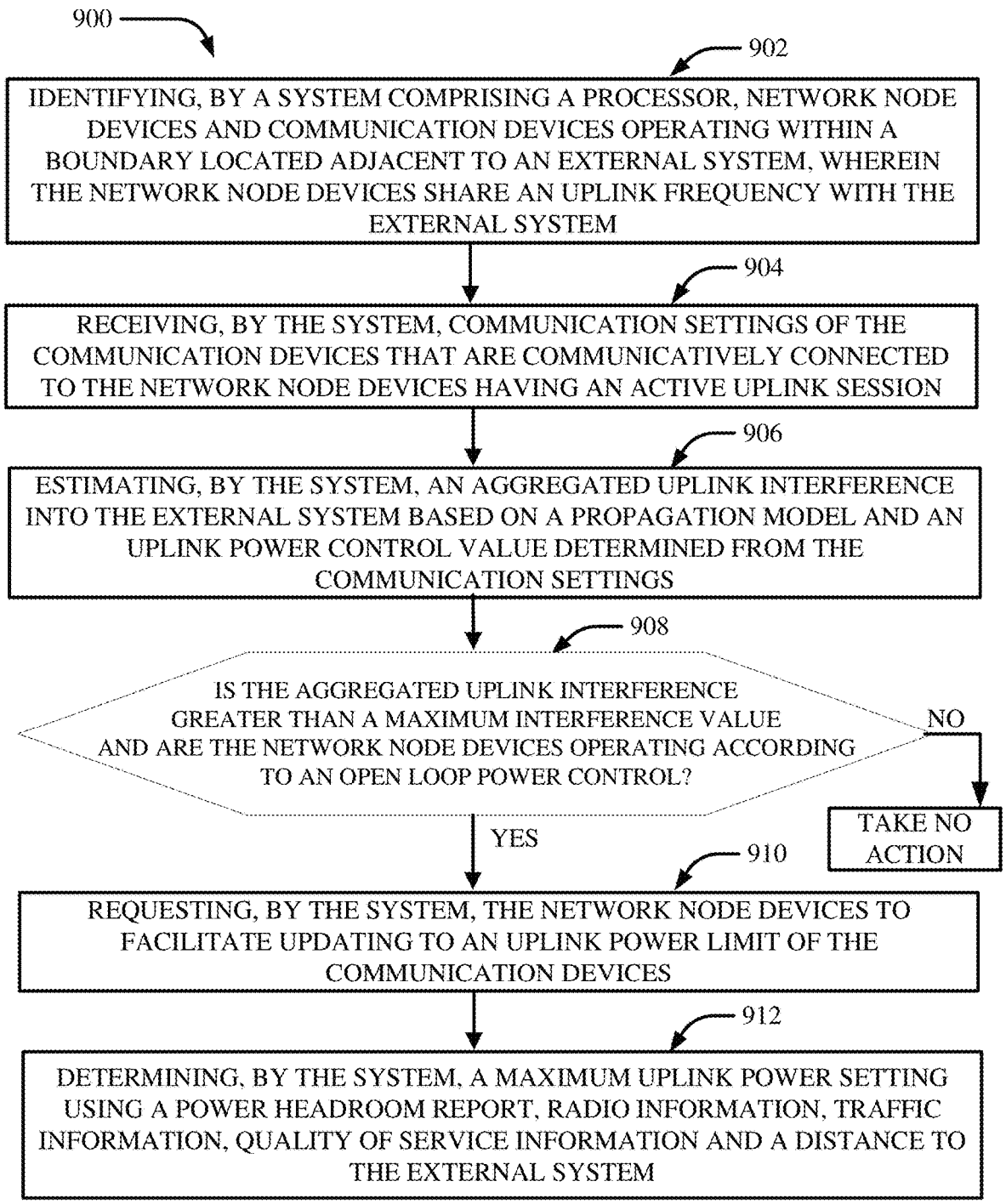
FIG. 9 depicts a diagram of an example, non-limiting computer implemented method that facilitates uplink interference avoidance under open loop power control conditions in accordance with one or more embodiments described herein.

FIG. 9 depicts a diagram of an example, non-limiting computer implemented method that facilitates uplink interference avoidance under open loop power control conditions in accordance with one or more embodiments described herein. Repetitive description of like elements employed in other embodiments described herein is omitted for sake of brevity. In some examples, flow diagram 900 can be implemented by operating environment 1100 described below. It can be appreciated that the operations of flow diagram 900 can be implemented in a different order than is depicted.

In non-limiting example embodiments, a computing device (or system) (e.g., computer 1102) is provided, the device or system comprising one or more processors and one or more memories that stores executable instructions that, when executed by the one or more processors, can facilitate performance of the operations as described herein, including the non-limiting methods as illustrated in the flow diagrams of FIG. 9.

Operation 902 depicts identifying, by a system comprising a processor, network node devices and communication devices operating within a boundary located adjacent to an external system, wherein the network node devices share an uplink frequency with the external system. Operation 904 depicts receiving, by the system, communication settings of the communication devices that are communicatively connected to the network node devices having an active uplink session. Operation 906 depicts estimating, by the system, an aggregated uplink interference into the external system based on a propagation model and an uplink power control value determined from the communication settings. Operation 908 depicts determining if the aggregated uplink interference is greater than a maximum interference value and are the network node devices are operating according to an open loop power control. If the aggregated uplink interference is greater than a maximum interference value and are the network node devices are operating according to an open loop power control, then perform operation 910. Otherwise, take no action and continue monitoring the connection. Operation 910 depicts, in response to determining that the aggregated uplink interference is greater than a maximum interference value and in response to determining that the network node devices are operating according to an open loop power control, requesting, by the system, the network node devices to facilitate updating to an uplink power limit (e.g., reducing uplink power limit) of the communication devices. Operation 912 depicts determining, by the system, a maximum uplink power limit (e.g. maximum uplink power setting) using a power headroom report, radio information, traffic information, quality of service information and a distance to the external system.

Figure 10:
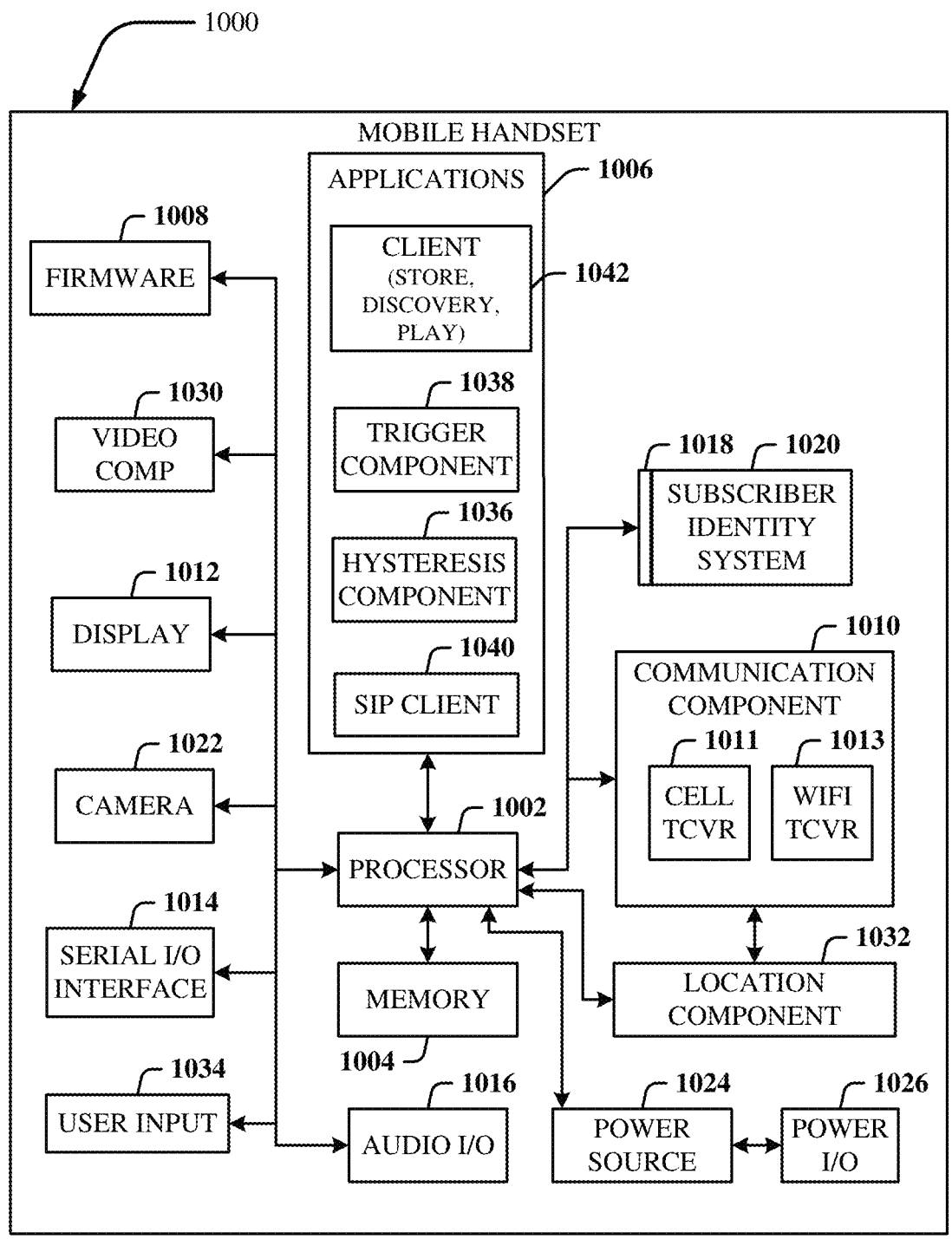
FIG. 10 illustrates an example block diagram of an example mobile handset operable to engage in a system architecture that facilitates wireless communications according to one or more embodiments described herein.

Referring now to FIG. 10, illustrated is an example block diagram of an example mobile handset 1000 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 1002 for controlling and processing all onboard operations and functions. A memory 1004 interfaces to the processor 1002 for storage of data and one or more applications 1006 (e.g., a video player software, user feedback component software, etc.). Other applications can include voice recognition of predetermined voice commands that facilitate initiation of the user feedback signals. The applications 1006 can be stored in the memory 1004 and/or in a firmware 1008 and executed by the processor 1002 from either or both the memory 1004 or/and the firmware 1008. The firmware 1008 can also store startup code for execution in initializing the handset 1000. A communications component 1010 interfaces to the processor 1002 to facilitate wired/wireless communication with external systems, e.g., cellular networks, VoIP networks, and so on. Here, the communications component 1010 can also include a suitable cellular transceiver 1011 (e.g., a GSM transceiver) and/or an unlicensed transceiver 1013 (e.g., Wi-Fi, WiMax) for corresponding signal communications. The handset 1000 can be a device such as a cellular telephone, a PDA with mobile communications capabilities, and messaging-centric devices. The communications component 1010 also facilitates communications reception from terrestrial radio networks (e.g., broadcast), digital satellite radio networks, and Internet-based radio services networks.

The handset 1000 includes a display 1012 for displaying text, images, video, telephony functions (e.g., a Caller ID function), setup functions, and for user input. For example, the display 1012 can also be referred to as a "screen" that can accommodate the presentation of multimedia content (e.g., music metadata, messages, wallpaper, graphics, etc.). The display 1012 can also display videos and can facilitate the generation, editing and sharing of video quotes. A serial I/O interface 1014 is provided in communication with the processor 1002 to facilitate wired and/or wireless serial communications (e.g., USB, and/or IEEE 1394) through a hardwire connection, and other serial input devices (e.g., a keyboard, keypad, and mouse). This can support updating and troubleshooting the handset 1000, for example. Audio capabilities are provided with an audio I/O component 1016, which can include a speaker for the output of audio signals related to, for example, indication that the user pressed the proper key or key combination to initiate the user feedback signal. The audio I/O component 1016 also facilitates the input of audio signals through a microphone to record data and/or telephony voice data, and for inputting voice signals for telephone conversations.

The handset 1000 can include a slot interface 1018 for accommodating a SIC (Subscriber Identity Component) in the form factor of a card Subscriber Identity Module (SIM) or universal SIM 1020, and interfacing the SIM card 1020 with the processor 1002. However, it is to be appreciated that the SIM card 1020 can be manufactured into the handset 1000, and updated by downloading data and software.

The handset 1000 can process IP data traffic through the communications component 1010 to accommodate IP traffic from an IP network such as, for example, the Internet, a corporate intranet, a home network, a person area network, etc., through an ISP or broadband cable provider. Thus, VoIP traffic can be utilized by the handset 1000 and IP-based multimedia content can be received in either an encoded or decoded format.

A video processing component 1022 (e.g., a camera) can be provided for decoding encoded multimedia content. The video processing component 1022 can aid in facilitating the generation, editing, and sharing of video quotes. The handset 1000 also includes a power source 1024 in the form of batteries and/or an AC power subsystem, which power source 1024 can interface to an external power system or charging equipment (not shown) by a power I/O component 1026.

The handset 1000 can also include a video component 1030 for processing video content received and, for recording and transmitting video content. For example, the video component 1030 can facilitate the generation, editing and sharing of video quotes. A location tracking component 1032 facilitates geographically locating the handset 1000. As described hereinabove, this can occur when the user initiates the feedback signal automatically or manually. A user input component 1034 facilitates the user initiating the quality feedback signal. The user input component 1034 can also facilitate the generation, editing and sharing of video quotes. The user input component 1034 can include such conventional input device technologies such as a keypad, keyboard, mouse, stylus pen, and/or touchscreen, for example.

Referring again to the applications 1006, a hysteresis component 1036 facilitates the analysis and processing of hysteresis data, which is utilized to determine when to associate with the access point. A software trigger component 1038 can be provided that facilitates triggering of the hysteresis component 1036 when the Wi-Fi transceiver 1013 detects the beacon of the access point. A SIP client 1040 enables the handset 1000 to support SIP protocols and register the subscriber with the SIP registrar server. The applications 1006 can also include a client 1042 that provides at least the capability of discovery, play and store of multimedia content, for example, music.

The handset 1000, as indicated above related to the communications component 1010, includes an indoor network radio transceiver 1013 (e.g., Wi-Fi transceiver). This function supports the indoor radio link, such as IEEE 802.11, for the dual-mode GSM handset 1000. The handset 1000 can accommodate at least satellite radio services through a handset that can combine wireless voice and digital radio chipsets into a single handheld device.

Figure 11:
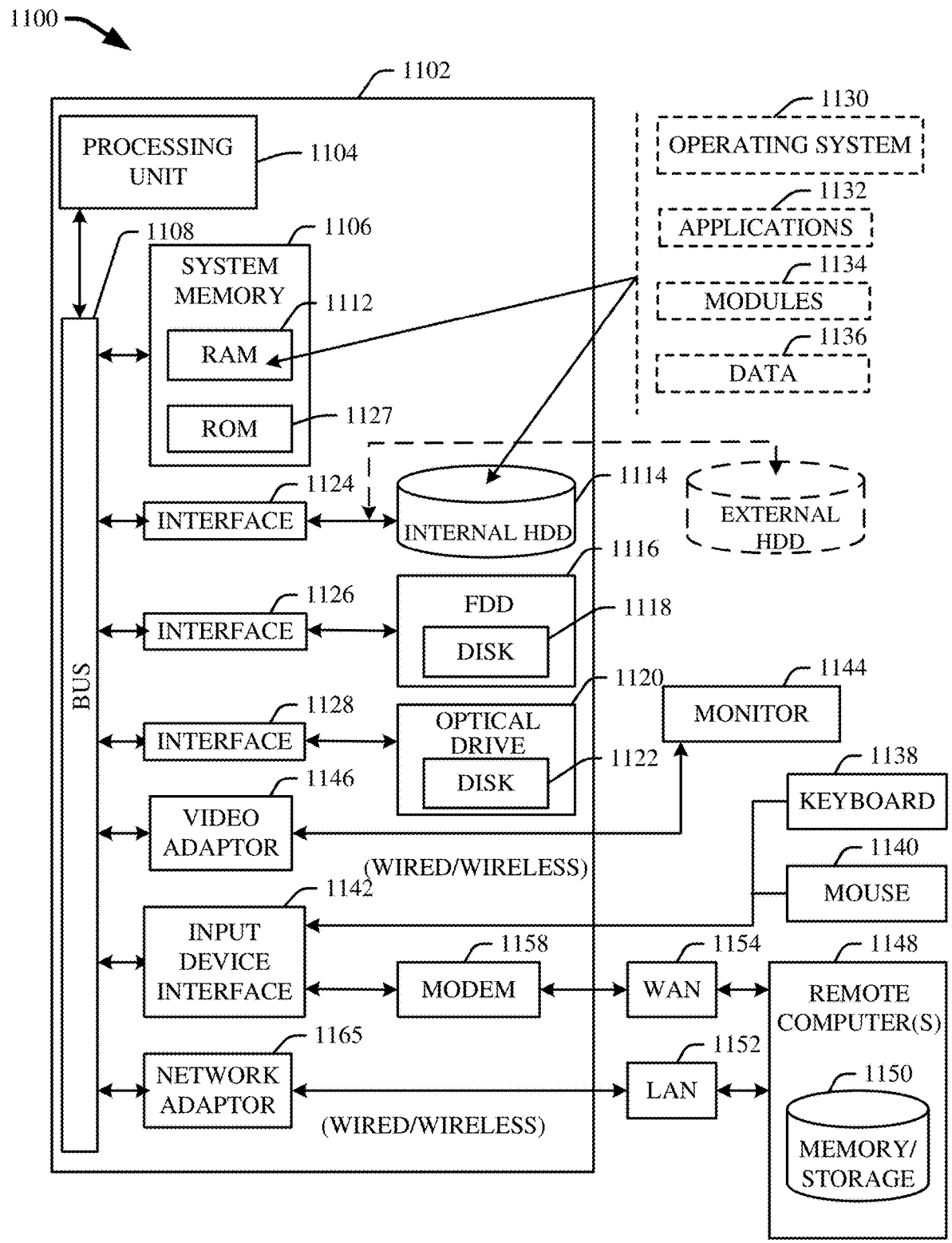
FIG. 11 illustrates an example block diagram of an example computer operable to engage in a system architecture that facilitates wireless communications according to one or more embodiments described herein.

With reference to FIG. 11, implementing various aspects described herein with regards to the end-user device can include a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes read-only memory (ROM) 1127 and random access memory (RAM) 1112. A basic input/output system (BIOS) is stored in a non-volatile memory 1127 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 can also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1102 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1102, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is to be appreciated that the innovation can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) can include a microphone, an IR remote control, a joystick, a game pad, a stylus pen, touchscreen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 through an interface, such as a video adapter 1146. In addition to the monitor 1144, a computer 1102 typically includes other peripheral output devices (not shown), such as speakers, printers, etc.

The computer 1102 can operate in a networked environment using logical connections by wired and/or wireless communications to one or more remote computers, such as a remote computer(s) 1148. The remote computer(s) 1148 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 is connected to the local network 1152 through a wired and/or wireless communication network interface or adapter 1156. The adapter 1156 can facilitate wired or wireless communication to the LAN 1152, which can also include a wireless access point disposed thereon for communicating with the wireless adapter 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 through the input device interface 1142. In a networked environment, program modules depicted relative to the computer, or portions thereof, can be stored in the remote memory/storage device 1150. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 9 Mbps (802.11a) or 54 Mbps (802.11b) data rate, for example, or with products that contain both bands (dual band), so the networks can provide real-world performance similar to the basic 16BaseT wired Ethernet networks used in many offices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as NR access. Accordingly, systems, methods, and/or machine-readable storage media for facilitating link adaptation of downlink control channel for 5G systems are desired. As used herein, one or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

Systems, methods and/or machine-readable storage media for facilitating a two-stage downlink control channel for 5G systems are provided herein. Legacy wireless systems such as LTE, Long-Term Evolution Advanced (LTE-A), High Speed Packet Access (HSPA) etc. use fixed modulation format for downlink control channels. Fixed modulation format implies that the downlink control channel format is always encoded with a single type of modulation (e.g., quadrature phase shift keying (QPSK)) and has a fixed code rate. Moreover, the forward error correction (FEC) encoder uses a single, fixed mother code rate of 1/3 with rate matching. This design does not take into the account channel statistics. For example, if the channel from the BS device to the mobile device is very good, the control channel cannot use this information to adjust the modulation, code rate, thereby unnecessarily allocating power on the control channel. Similarly, if the channel from the BS to the mobile device is poor, then there is a probability that the mobile device might not able to decode the information received with only the fixed modulation and code rate. As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
a processor; and
a memory that stores executable instructions that, when executed by the processor, facilitate performance of operations, comprising:
identifying network node devices and communication devices operating within a boundary located adjacent to an external system;
determining communication settings of the communication devices that are engaged in an uplink session with the network node devices;
estimating a total uplink interference into the external system based on a propagation model and an uplink power control value determined from the communication settings; and
in response to determining that the total uplink interference is greater than a defined value and in response to determining that the network node devices employed an open loop power control, requesting the network node devices to initiate an update to an uplink power limit of the communication devices engaged in the uplink session with the network node devices.

2. The system of claim 1, wherein the operations further comprise:
in response to the determining that the total uplink interference is greater than the defined value and in response to the determining that the network node devices employed the open loop power control, determining an updated maximum uplink power control value to use for the uplink power limit of the communication devices.

3. The system of claim 2, wherein the operations further comprise:
evaluating a communication type and a quality of service assigned to the communication type to determine the updated maximum uplink power control value.

4. The system of claim 1, wherein the operations further comprise:
determining an updated maximum uplink power control value based on a type of uplink communication in which the communication devices are engaged and a quality of service assigned to the communication devices for the type of uplink communication.

5. The system of claim 1, wherein the operations further comprise:
determining an updated maximum uplink power control value using a power headroom report, radio information, traffic information and quality of service information.

6. The system of claim 5, wherein the radio information comprises a reference signal received power and a reference signal received quality.

7. The system of claim 1, wherein the defined value is associated with a maximum interference value allowed by the external system, and wherein an uplink frequency used by the network node devices causes interference with the external system.

8. A method, comprising:
identifying, by a system comprising a processor, network node devices and communication devices operating within a boundary located adjacent to an external system, wherein the network node devices share an uplink frequency with the external system;
receiving, by the system, communication settings of the communication devices that are communicatively connected to the network node devices having an active uplink session;
estimating, by the system, an aggregated uplink interference into the external system based on a propagation model and an uplink power control value determined from the communication settings; and
in response to determining that the aggregated uplink interference is greater than a maximum interference value and in response to determining that the network node devices are operating according to an open loop power control, requesting, by the system, the network node devices to facilitate updating to an uplink power limit of the communication devices.

9. The method of claim 8, further comprising:
in response to the determining that the aggregated uplink interference is greater than the maximum interference value and in response to the determining that the network node devices are operating according to the open loop power control, determining, by the system, a maximum uplink power control value to use for the uplink power limit of the communication devices operating within a geographical boundary adjacent to the external system.

10. The method of claim 9, wherein determining the maximum uplink power control value is based on a portion of the communication settings.

11. The method of claim 8, further comprising:
determining, by the system, a maximum uplink power setting based on a group of the communication settings used by the network node devices for updating the uplink power limit, wherein the communication settings comprise traffic profile setting, user behavior settings, quality of service settings, and a maximum uplink power value.

12. The method of claim 8, further comprising:
determining, by the system, a maximum uplink power setting using a power headroom report, radio information, traffic information, quality of service information and a distance to the external system.

13. The method of claim 12, wherein the radio information comprises a reference signal received power and a reference signal received quality.

14. The method of claim 8, wherein the maximum interference value is associated with a maximum interference allowed by the external system for operation, and wherein the uplink frequency used by the network node devices causes interference with the external system.

15. A non-transitory machine-readable storage medium, comprising executable instructions that, when executed by a processor, facilitate performance of operations, comprising:
identifying a group of network node devices and communication devices operating within a boundary located adjacent to an external system, wherein the external system and the group of network node devices share an uplink frequency;
receiving communication settings of the communication devices that are communicatively connected to the group of network node devices having an active uplink session;
estimating an average uplink interference into the external system based on a propagation model and an uplink power control value calculated from the communication settings of the communication devices that are communicatively connected to the group of network node devices; and
in response to determining that the average uplink interference is greater than a defined interference value and in response to determining that the group of network node devices that operate an open loop power control, requesting the group of network node devices to send a paging message to facilitate an update to an uplink power limit of the communication devices.

16. The non-transitory machine-readable storage medium of claim 15, wherein the operations further comprise:
determining a maximum uplink power control setting to be used by the communication devices operating within a geographical boundary adjacent to the external system.

17. The non-transitory machine-readable storage medium of claim 16, wherein the determining the maximum uplink power control setting is based on a portion of the communication settings.

18. The non-transitory machine-readable storage medium of claim 15, wherein the operations further comprise:
determining a maximum uplink power control setting based on a subset of the communication settings, wherein the communication settings comprise at least one of a traffic profile setting, a user behavior setting, a quality of service setting, or a maximum uplink power control value.

19. The non-transitory machine-readable storage medium of claim 15, wherein the operations further comprise:
determining a maximum uplink power control setting based on at least one of a power headroom report, radio information, traffic information, quality of service information or a distance to the external system.

20. The non-transitory machine-readable storage medium of claim 15, wherein the defined interference value is associated with a maximum interference for which the external system is rated, and wherein the uplink frequency, used by the group of network node devices, causes interference with the external system.

* * * * *